(12) United States Patent
Hiramoto et al.

(10) Patent No.: US 10,726,598 B2
(45) Date of Patent: Jul. 28, 2020

(54) MAP DISPLAY SYSTEM AND MAP DISPLAY PROGRAM

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Naoyuki Hiramoto, Takahama (JP); Nobuhide Kuroda, Okazaki (JP); Yuji Sato, Owariasahi (JP); Xin Jin, Nagoya (JP); Kazunori Watanabe, Okazaki (JP)

(73) Assignees: TOYOTA JIDOSHA KABUSHIKI KAISHA, Toyota-shi, Aichi-ken (JP); AISIN AW CO., LTD., Anjo-shi, Aichi-ken (JP)

( * ) Notice: Subject to any disclaimer, the term of this patent is extended or adjusted under 35 U.S.C. 154(b) by 0 days.

(21) Appl. No.: 16/095,036

(22) PCT Filed: May 17, 2017

(86) PCT No.: PCT/JP2017/018505
§ 371 (c)(1),
(2) Date: Oct. 19, 2018

(87) PCT Pub. No.: WO2017/199998
PCT Pub. Date: Nov. 23, 2017

(65) Prior Publication Data
US 2019/0156540 A1    May 23, 2019

(30) Foreign Application Priority Data

May 19, 2016 (JP) .................................. 2016-100325

(51) Int. Cl.
*G06T 11/60* (2006.01)
*G09B 29/00* (2006.01)
*G01C 21/36* (2006.01)

(52) U.S. Cl.
CPC .......... *G06T 11/60* (2013.01); *G01C 21/3673* (2013.01); *G09B 29/00* (2013.01)

(58) Field of Classification Search
CPC .......................... G01C 21/3673; G09B 29/00
See application file for complete search history.

(56) References Cited

U.S. PATENT DOCUMENTS

| 5,501,538 A * | 3/1996 | Sawada ................... B41B 19/00 400/304 |
| 5,559,938 A * | 9/1996 | Van Roekel ....... G01C 21/3673 345/440 |

(Continued)

FOREIGN PATENT DOCUMENTS

| JP | 5-269956 A | 10/1993 |
| JP | 8-194432 A | 7/1996 |

(Continued)

OTHER PUBLICATIONS

International Search Report for PCT/JP2017/018505 dated, Jul. 4, 2017 (PCT/ISA/210).

*Primary Examiner* — Terrell M Robinson
(74) *Attorney, Agent, or Firm* — Sughrue Mion, PLLC (57) ABSTRACT

There is provided a technique for arranging characters along a road to improve appearance and readability. A map display system includes a temporarily arranging part that obtains directions of a plurality of characters for when the plurality of characters are temporarily arranged along a road in a direction of the road, the direction of the road being a reference direction; and an arranging part that arranges, when a difference between directions of consecutive characters is greater than or equal to a threshold value, the (Continued)

consecutive characters so as to reduce the difference, the consecutive characters being two consecutive characters in the direction of the road, and arranges, when the difference is less than the threshold value, the consecutive characters in a temporary arrangement position.

5 Claims, 4 Drawing Sheets

(56) References Cited

U.S. PATENT DOCUMENTS

| | | | |
|---|---|---|---|
| 9,928,572 B1* | 3/2018 | Magouyrk | G06T 3/60 |
| 2006/0227349 A1* | 10/2006 | Yamaguchi | G06F 40/109 |
| | | | 358/1.11 |
| 2007/0021911 A1* | 1/2007 | Kikuchi | G01C 21/3673 |
| | | | 701/455 |
| 2008/0097692 A1 | 4/2008 | Fukumoto et al. | |
| 2008/0136841 A1* | 6/2008 | Oshitani | G01C 21/3673 |
| | | | 345/636 |
| 2008/0231643 A1 | 9/2008 | Fletcher et al. | |
| 2009/0022426 A1* | 1/2009 | Yamazaki | G01C 21/3673 |
| | | | 382/296 |
| 2010/0097399 A1* | 4/2010 | Rajagopalan | G01C 21/3673 |
| | | | 345/636 |
| 2012/0078505 A1* | 3/2012 | Nakamura | G01C 21/3673 |
| | | | 701/411 |
| 2013/0321429 A1* | 12/2013 | Miyamoto | G09B 29/106 |
| | | | 345/442 |
| 2014/0152670 A1* | 6/2014 | Miyamoto | G06T 11/60 |
| | | | 345/467 |
| 2018/0301111 A1* | 10/2018 | Park | G09B 29/00 |

FOREIGN PATENT DOCUMENTS

| | | | |
|---|---|---|---|
| JP | 2008-102002 A | | 5/2008 |
| JP | 2015-55738 A | | 3/2015 |
| JP | 2015055738 A | * | 3/2015 |

* cited by examiner

MAP DISPLAY SYSTEM AND MAP DISPLAY PROGRAM

CROSS REFERENCE TO RELATED APPLICATIONS

This application is a National Stage of International Application No. PCT/JP2017/018505 filed May 17, 2017, claiming priority based on Japanese Patent Application No. 2016-100325, filed May 19, 2016.

TECHNICAL FIELD

The aspects of the present application relate to a map display system and a map display program.

BACKGROUND ART

There is known a technique for displaying a road name along a road (see Patent Literature 1). In Patent Literature 1, a linear road portion of a road serves as a portion where a road name is displayed.

CITATIONS LIST

Patent Literature

Patent Literature 1: JP 2008-102002 A

SUMMARY

Technical Problems

However, there may be no linear road portion, and thus, there has been a case in which a road name needs to be displayed along a curved road portion. In such a case, the directions of characters forming a road name vary, causing a problem that the appearance and readability of the road name become poor. Specifically, when characters whose directions greatly differ from each other are arranged, appearance and readability become poor.

The aspects of the application were made in view of the above-described problem, and provide a technique capable of arranging characters along a road so as to improve appearance and readability.

Solutions to Problems

To provide the above-described technique, a map display system of the application includes: a temporarily arranging part that obtains directions of a plurality of characters for when the plurality of characters are temporarily arranged along a road in a direction of the road, the direction of the road being a reference direction; and an arranging part that arranges, when a difference between directions of consecutive characters is greater than or equal to a threshold value, the consecutive characters so as to reduce the difference, the consecutive characters being two consecutive characters in the direction of the road, and arranges, when the difference is less than the threshold value, the consecutive characters in a temporary arrangement position.

To provide the above-described technique, a map display program of the application causes a computer to function as: a temporarily arranging part that obtains directions of a plurality of characters for when the plurality of characters are temporarily arranged along a road in a direction of the road, the direction of the road being a reference direction; and an arranging part that arranges, when a difference between directions of consecutive characters is greater than or equal to a threshold value, the consecutive characters so as to reduce the difference, the consecutive characters being two consecutive characters in the direction of the road, and arranges, when the difference is less than the threshold value, the consecutive characters in a temporary arrangement position.

In the above-described configurations, consecutive characters whose directions greatly differ from each other can be arranged so as to reduce the difference between the directions, enabling to suppress the perception that the spacing between the consecutive characters is tight. Therefore, characters can be arranged along a road so as to improve appearance and readability.

DESCRIPTION OF EMBODIMENTS

Here, the embodiments will be described in the following order:
(1) Configuration of a navigation system;
(2) Map display process; and
(3) Other embodiments.

(1) Configuration of a Navigation System

Figure 1:
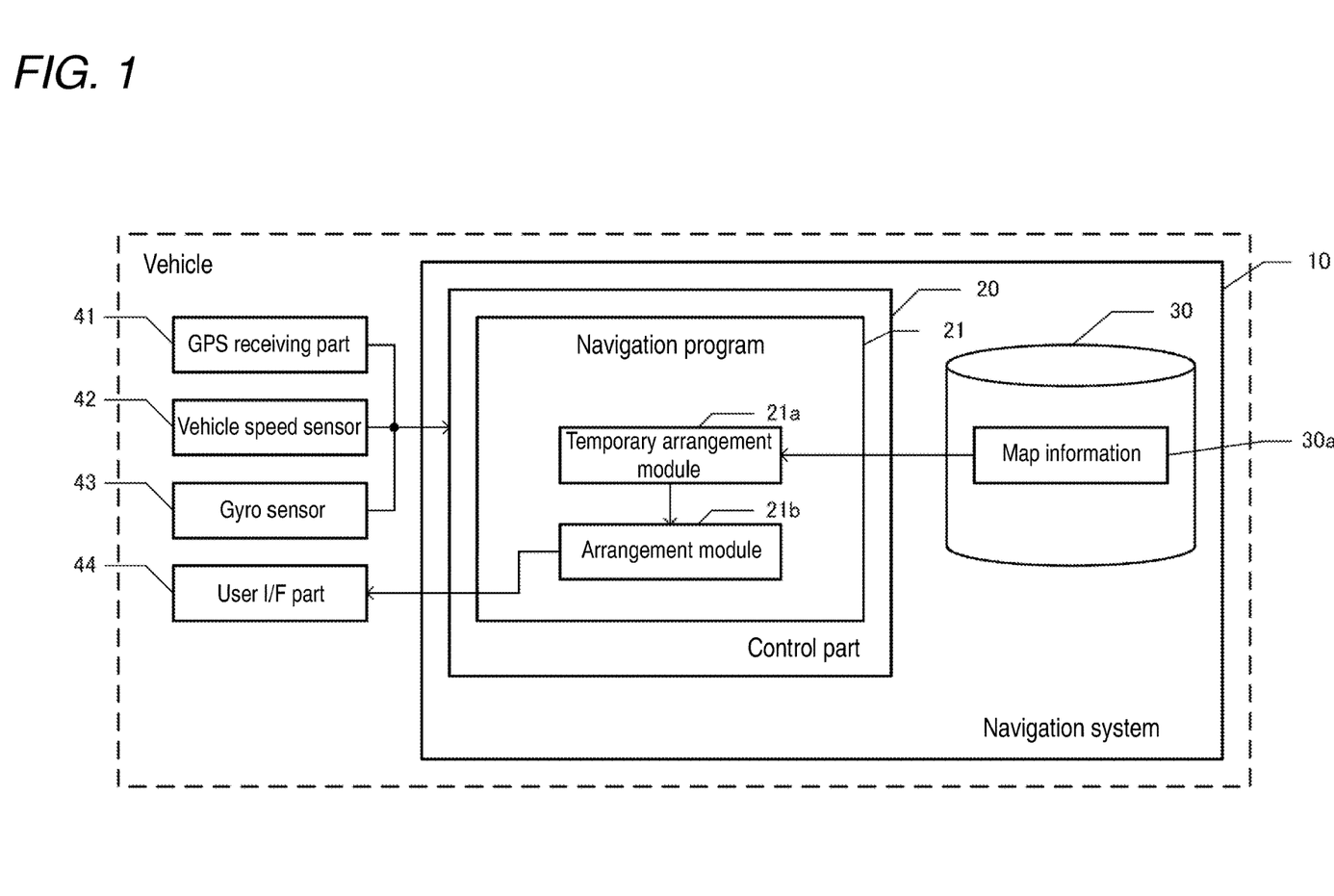
FIG. 1 is a block diagram of a navigation system.

FIG. 1 is a block diagram showing a configuration of a navigation system 10 serving as a map display system according to one embodiment. The navigation system 10 is provided in a vehicle. The navigation system 10 includes a control part 20 and a recording medium 30. The control part 20 includes a CPU, a RAM, a ROM, etc., and executes a navigation program 21 stored in the recording medium 30 or the ROM.

The recording medium 30 has map information 30a recorded therein. The map information 30a includes, for example, link data that identifies a link that connects two nodes, and node data representing the locations of the nodes, etc. The link corresponds to a road section in which the vehicle can travel, and the nodes correspond to intersections which are the end points in a length direction of the link. The node data includes information about the intersections corresponding to the nodes. The link data includes shape interpolation point data representing the location of a shape interpolation point which is set at the center in a width direction of the link. The link data includes information indicating a route name of a route formed by the link. A plurality of consecutive links form a single route, and the route name is recorded so as to be associated with the links.

The vehicle includes a GPS receiving part 41, a vehicle speed sensor 42, a gyro sensor 43, and a user I/F part 44. The GPS receiving part 41 receives radio waves from GPS satellites, and outputs a signal for calculating a current vehicle location, through an interface which is not shown. The vehicle speed sensor 42 outputs a signal corresponding to the rotational speed of wheels provided on the vehicle. The control part 20 obtains a vehicle speed based on the signal from the vehicle speed sensor 42. The gyro sensor 43 detects angular acceleration for a turn in a horizontal plane of the vehicle, and outputs a signal corresponding to vehicle's orientation. The control part 20 obtains a vehicle's traveling direction based on the signal from the gyro sensor 43. The control part 20 obtains a current vehicle location by identifying a vehicle's traveling path based on the output signals from the vehicle speed sensor 42, the gyro sensor 43, and the like. The output signal from the GPS receiving part 41 is used, for example, to correct the current vehicle location identified by the vehicle speed sensor 42, the gyro sensor 43, and the like.

The user I/F part 44 is an interface part for providing various types of information to a user or accepting, as input, user's instructions. In the present embodiment, the user I/F part 44 includes a touch panel display and a speaker that outputs audio, which are not shown. The touch panel display is a display part that displays a map. The control part 20 outputs control signals to the user I/F part 44 to display an arbitrary image and to output arbitrary audio from the speaker. In addition, the control part 20 obtains user settings based on touch operations on the touch panel display serving as an input part.

The navigation program 21 corresponds to a map display program. The navigation program 21 includes a temporary arrangement module 21*a* and an arrangement module 21*b*. The temporary arrangement module 21*a* and the arrangement module 21*b* are program modules that cause the control part 20 serving as a computer to function as a temporarily arranging part and an arranging part, respectively.

By the function of the temporary arrangement module 21*a*, the control part 20 obtains directions of a plurality of characters for when the plurality of characters are temporarily arranged along a road in a direction of the road which is a reference direction. In the present embodiment, by the function of the temporary arrangement module 21*a*, the control part 20 actually temporarily arranges a plurality of characters along a road in a direction of the road which is a reference direction, and then obtains the directions of the plurality of characters. First, by the function of the temporary arrangement module 21*a*, the control part 20 renders a map to be displayed on the touch panel display, based on the map information 30*a*, and obtains the location and shape of a road included in the map. The location and shape of the road are the location and shape of a polyline that connects nodes and shape interpolation points which are indicated by the map information 30*a*.

Figure 2A:
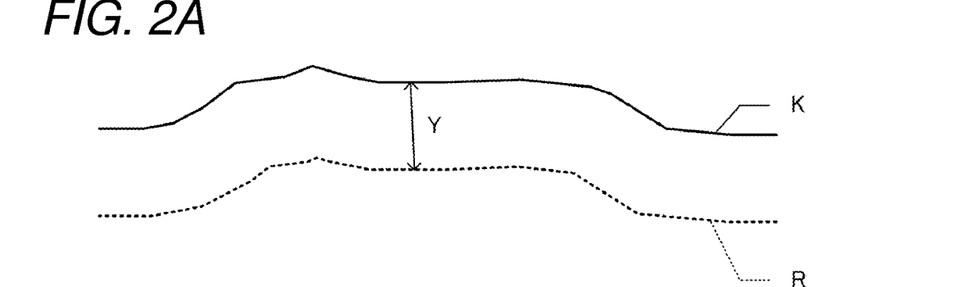
FIGS. 2A, 2C, and 2D are diagrams showing examples of a map.

FIG. 2A shows an example of a map. In FIG. 2A, a road line R (broken line) representing the location and shape of a road is formed on the map. The road line R is a polyline that connects road points which are points obtained by plotting nodes and shape interpolation points on the map. The road line R may be an approximate curve that approximates the road points.

By the function of the temporary arrangement module 21*a*, the control part 20 obtains a reference line K (solid line) which is offset from the road line R by a certain offset distance Y in a direction perpendicular to the road line R. The offset distance Y may be set based on the size of characters representing a route name of the road, or may be set to the magnitude of a length that is one-half or more (a factor of 0.5 to 1.0, etc.) of the length in a longitudinal direction of the characters.

Figure 2B:
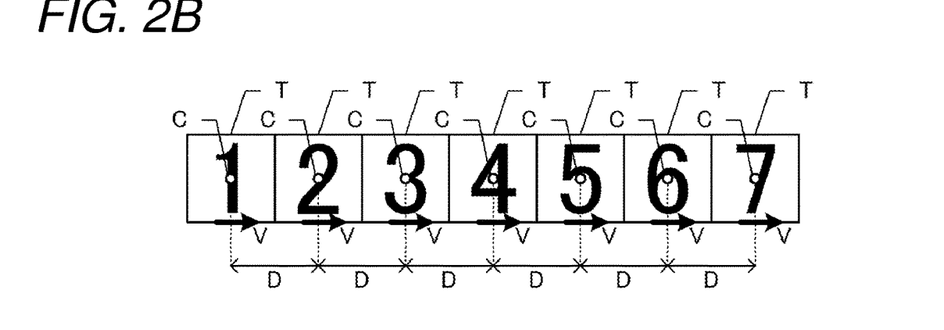
FIG. 2B is a diagram showing a road name.

By the function of the temporary arrangement module 21*a*, the control part 20 obtains a route name of the road corresponding to the road line R from link data included in the map information 30*a*, and obtains text images of respective characters forming the route name from font data which is not shown. FIG. 2B is a diagram showing text images T representing a plurality of characters "1", "2", "3", "4", "5", "6", and "7", respectively, which form the route name. The text images T are rectangular images, and the lengths in longitudinal and transverse directions are common between the characters. Note that the length in the transverse direction of the text image T may differ between the characters so that, when the text images T are arranged with no clearance therebetween, the spacings between the characters are perceived to be uniform. The center of mass of the text image T is defined as a center point C, and the direction of a base of the text image T is defined as a direction V of a character represented by the text image T. By the function of the temporary arrangement module 21*a*, the control part 20 sets the center points C and the directions V on the map, and thereby temporarily arranges the characters. Note that a portion of the text image T other than the character is a transparent image, and the outline of the text image T is also actually transparent.

Figure 2C:
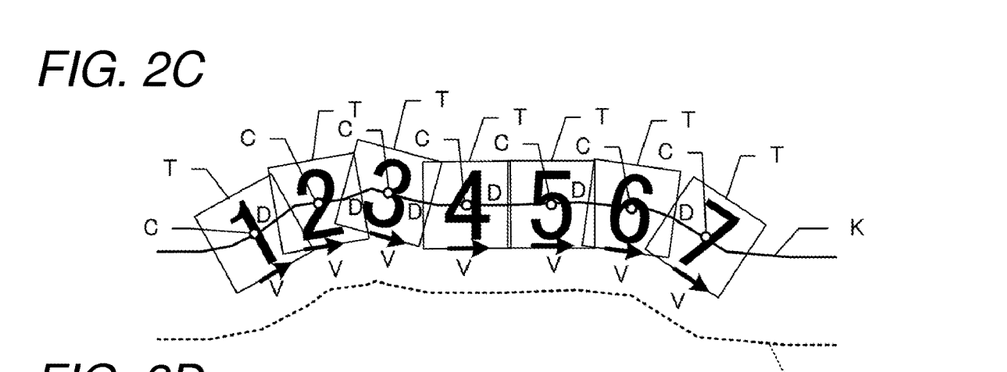

As shown in FIG. 2C, by the function of the temporary arrangement module 21*a*, the control part 20 temporarily arranges the center points C of the text images T on the reference line K to allow the directions of portions of the reference line K at the center points C to coincide with the directions V of the respective characters. That is, by the function of the temporary arrangement module 21*a*, the control part 20 obtains the directions of portions of the reference line K at the center points C, as the directions V of the respective characters. Spacings (distances on the reference line K) between the text images T which are consecutively and temporarily arranged in a direction along the road line R remain at spacings D of FIG. 2B. The spacings D are spacings between the consecutive center points C for when the text images T are arranged with no clearance therebetween. That is, the spacing D between the center points C is one-half of a total value of the lengths in the transverse direction of each text image T (i.e., the length in the transverse direction).

Note that the center points C may be temporarily arranged in any position on the reference line K as long as the spacings D are secured. For example, the control part 20 may temporarily arrange the center points C such that the text images T are arranged in a position as far away as possible from road lines R of other roads or other display objects (icons representing facilities, etc.). Specifically, the control part 20 may temporarily arrange the center points C in a position midway between two other road lines R intersecting the road line R. In addition, the control part 20 may temporarily arrange the center points C in a position with the highest degree of linearity of the reference line K.

When the difference between the directions of consecutive characters which are two consecutive characters in the direction of the road is greater than or equal to a threshold value, by the function of the arrangement module 21*b*, the control part 20 arranges the consecutive characters so as to reduce the difference. When the difference is less than the threshold value, the control part 20 arranges the consecutive characters in a temporary arrangement position. In the present embodiment, since the characters are temporarily arranged in advance in a temporary arrangement position, when the difference between the directions of consecutive characters which are two characters consecutively and temporarily arranged in the direction of the road is greater than or equal to the threshold value, by the function of the arrangement module 21*b*, the control part 20 corrects the position of the consecutive characters from the temporary arrangement position so as to reduce the difference, and when the difference is less than the threshold value, the control part 20 maintains the arrangement of the consecutive characters. Specifically, by the function of the arrangement module 21b, the control part 20 obtains, as consecutive characters, all combinations of two characters that are arranged in a consecutive sequence in the direction of the road line R. In the example of FIG. 2C, two characters "1" and "2", two characters "2" and "3", two characters "3" and "4", two characters "4" and "5", two characters "5" and "6", and two characters "6" and "7" each are obtained as consecutive characters.

The control part 20 obtains the directions V of the respective two characters forming consecutive characters, and obtains the difference between the directions V. Specifically, the control part 20 obtains, as the difference, the absolute value of an angle formed by the directions V of the consecutive characters. In the example of FIG. 2C, it is assumed that the difference between the directions V of "2" and "3" which are consecutive characters and the directions V of "6" and "7" which are consecutive characters are greater than or equal to the threshold value. The threshold value may be a predetermined value (e.g., 10°), a value that can be set by a user, a value that is set according to the size of characters, a value that is set according to the type (alphabet, Chinese characters, hiragana, katakana, etc.) or color of characters, or a value that is set according to a map scale.

When the difference between the directions V of the consecutive characters is greater than or equal to the threshold value, by the function of the arrangement module 21b, the control part 20 arranges the consecutive characters along a single arrangement straight line such that the directions V are identical. Specifically, the control part 20 sets, as an arrangement straight line L (dash-dotted line), a straight line of a direction V of a character on the center side in the direction of the road which is one of the consecutive characters whose difference in direction V is greater than or equal to the threshold value. In addition, the control part 20 sets the arrangement straight line L such that the arrangement straight line L passes through a center point C of the character on the center side in the direction of the road which is one of the consecutive characters whose difference in direction V is greater than or equal to the threshold value. Then, the control part 20 maintains the position and direction V of the character on the center side in the direction of the road which is one of the consecutive characters whose difference in direction V is greater than or equal to the threshold value, and corrects the position and direction V of a character on the outer side in the direction of the road which is one of the consecutive characters whose difference in direction V is greater than or equal to the threshold value. Specifically, the control part 20 corrects a center point C of a text image T of the character on the outer side in the direction of the road which is one of the consecutive characters whose difference in direction V is greater than or equal to the threshold value, onto the arrangement straight line L, and rotates the text image T around the center point C, and thereby corrects the direction V of the character to be the same direction as the arrangement straight line L. At this time, the control part 20 maintains the spacing D between the consecutive characters at the spacing D for the temporary arrangement.

Figure 2D:
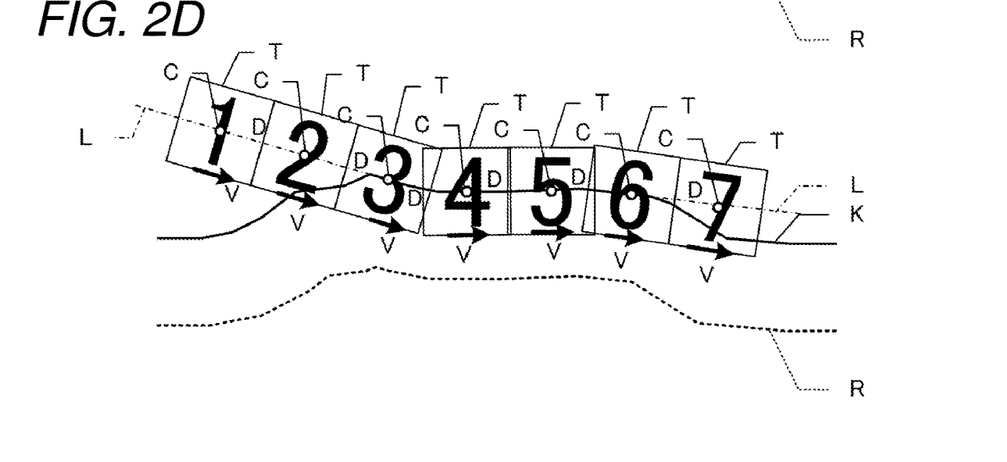

FIG. 2D shows an example of a map in which the positions and directions V of characters are corrected from the state of FIG. 2C. In the examples of FIGS. 2C and 2D, of "2" and "3" which are consecutive characters whose difference in direction V is greater than or equal to the threshold value, the position and direction V of "3" which is a character on the center side in the direction of the road are maintained, and a center point C of a text image T of "2" which is a character on the outer side is corrected onto an arrangement straight line L, and a direction V of the text image T of "2" is corrected to be the same direction as the arrangement straight line L. As a result of the correction, the center points C of the text images T of "2" and "3" which are consecutive characters whose difference in direction V is greater than or equal to the threshold value are both located on the arrangement straight line L, and their directions V are identical. That is, for consecutive characters whose difference in direction V is greater than or equal to the threshold value, the control part 20 reduces the difference between the directions V of the consecutive characters to 0. Likewise, of "6" and "7" which are consecutive characters whose difference in direction V is greater than or equal to the threshold value, the position and direction V of "6" which is a character on the center side in the direction of the road are maintained, and a center point C of a text image T of "7" which is a character on the outer side is corrected onto an arrangement straight line L, and a direction V of the text image T of "7" is corrected to be the same direction as the arrangement straight line L. As a result of the correction, the center points C of the text images T of "6" and "7" which are consecutive characters whose difference in direction V is greater than or equal to the threshold value are both located on the arrangement straight line L, and their directions V are identical.

By the function of the arrangement module 21b, the control part 20 selects consecutive characters from consecutive characters at the center to the outer side in the direction of the road in turn, as a target for correcting the direction V of a character. In addition, when the control part 20 sets, by the function of the arrangement module 21b, an arrangement straight line L for consecutive characters, the control part 20 arranges all characters on the outer side in the direction of the road than the consecutive characters, along the arrangement straight line L.

In the case of FIG. 2D, of "1", "2", "3", "4", "5", "6", and "7", "4" is a center character in the direction of the road, and "3" and "4" or "4" and "5" which are consecutive characters are center consecutive characters. For example, the control part 20 selects "4" and "5" which are center consecutive characters, as a target to be corrected first, and determines whether the difference between the directions V of "4" and "5" is greater than or equal to the threshold value. Since the difference between the directions V of "4" and "5" which are consecutive characters is less than the threshold value, "4" and "5" are maintained in the temporary arrangement state. Then, the control part 20 selects "3" and "4" and "5" and "6" which are consecutive characters located immediately on the outer side (left and right sides) of "4" and "5", as a target for correcting the direction V of a character. Since the differences between the directions V of "3" and "4" and "5" and "6" which are consecutive characters are less than the threshold value, "3" and "4" and "5" and "6" are maintained in the temporary arrangement state. Then, the control part 20 selects "2" and "3" and "6" and "7" which are consecutive characters located immediately on the outer side of "3" and "4" and "5" and "6", as a target for correcting the direction V of a character. Since the differences between the directions V of "2" and "3" and "6" and "7" which are consecutive characters are greater than or equal to the threshold value, "2" and "3" and "6" and "7" are arranged along arrangement straight lines L, respectively, that pass through center points C of "3" and "6" which are characters on the center side and that have the same directions as the directions V of "3" and "6". Here, since the arrangement straight line L is set for "2" and "3" which are consecutive characters, "1" which is a character on the outer side (left side) than "2" and "3" is also arranged along the arrangement straight line L on which "2" and "3 are arranged.

In the configuration of the present embodiment described above, when the difference between the directions V of consecutive characters which are two characters consecutively and temporarily arranged in the direction of the road is greater than or equal to the threshold value, the control part 20 arranges the consecutive characters along a single arrangement straight line L such that the directions V are identical. When the difference is less than the threshold value, the control part 20 maintains the arrangement of the consecutive characters. Hence, consecutive characters whose directions V greatly differ from each other can be corrected such that the directions V are identical to each other, enabling to suppress the perception that the spacing between the consecutive characters is tight. Therefore, characters can be arranged along the road so as to improve appearance and readability.

In addition, by determining, for each set of consecutive characters, whether the difference between directions V is greater than or equal to the threshold value, some of a plurality of characters ("3", "4", "5", and "6" of FIG. 2D) can be arranged in the temporary arrangement position, and the rest of the plurality of characters ("1", "2", and "3" and "6" and "7" of FIG. 2D) can be arranged along their arrangement straight lines L. By this, portions with poor appearance and readability can be arranged along their arrangement straight lines, and other portions can maintain a state of being arranged along the road. Therefore, both the impression that the characters are arranged along the road, and appearance and readability can be obtained. Note that it can be considered that "3" and "6" of FIG. 2D are temporarily arranged along the road and are arranged along their arrangement straight lines L.

Furthermore, by selecting consecutive characters which are a processing target from the center to the outer side in the direction of the road in turn, some of a plurality of characters including the center ("3", "4", "5", and "6" of FIG. 2D) can be arranged in the temporary arrangement position, and the rest of the plurality of characters ("1", "2", and "3" and "6" and "7" of FIG. 2D) can be arranged along their arrangement straight lines L. As such, since a portion including the center can maintain a state of being arranged along the road, the impression that the characters are arranged along the road can be attained.

Needless to say, in the present embodiment, when the differences between the directions V of all consecutive characters are less than the threshold value, all of the plurality of characters are maintained in a state of being temporarily arranged along the road. As such, when a change in direction is small for the entire portion of the road where the characters are temporarily arranged, since all characters originally have excellent appearance and readability in a state in which the characters are temporarily arranged along the road, both the arrangement of the characters along the road and appearance and readability can be obtained. Furthermore, when the directions V of consecutive characters which are the first ones to be selected as a processing target are greater than or equal to the threshold value, all characters are arranged along a single arrangement straight line L. As such, when a change in direction is large at a central portion of the road where the characters are temporarily arranged, appearance and readability can be given priority over the arrangement of the characters along the road.

(2) Map Display Process

Figure 3:
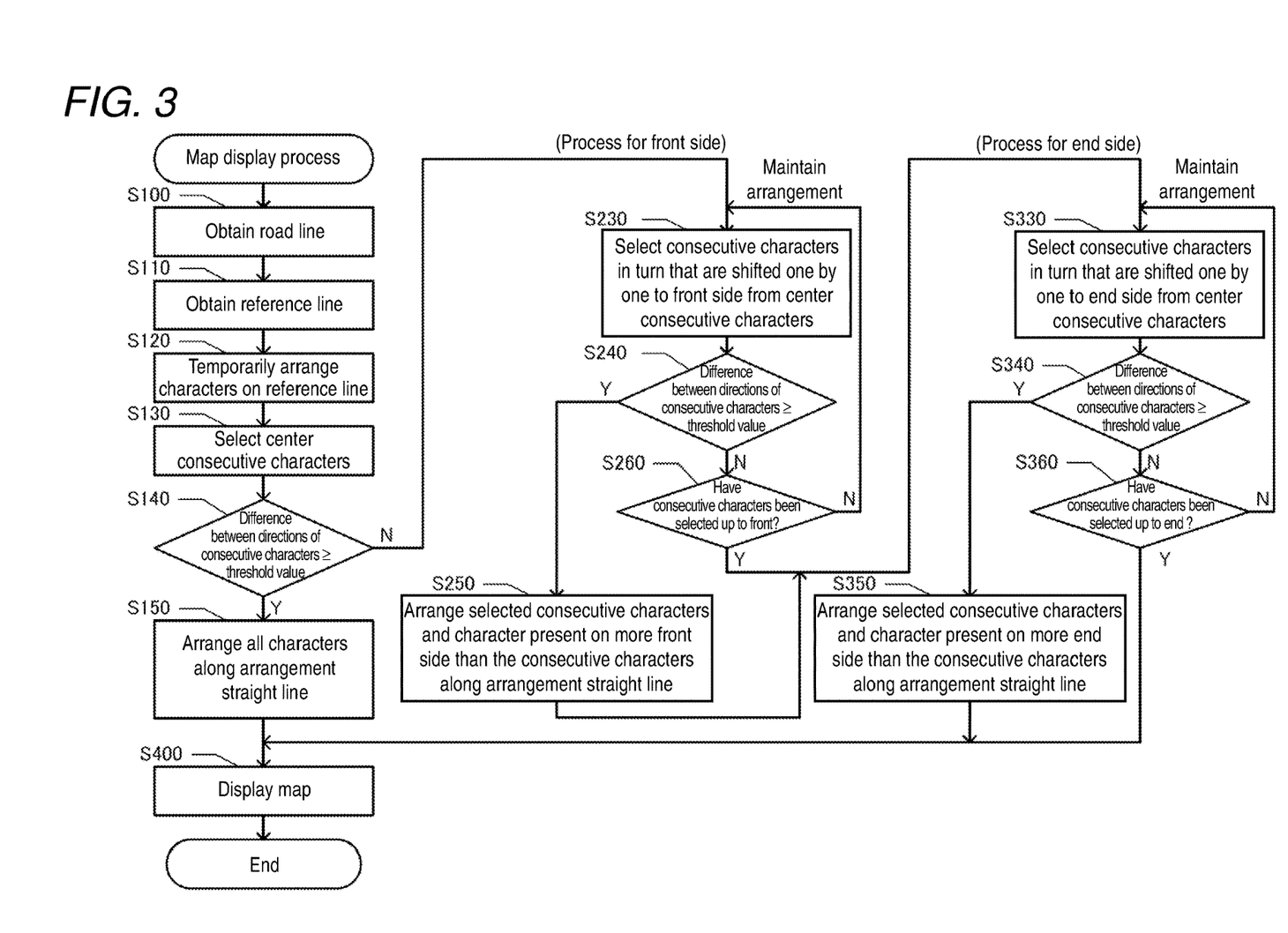
FIG. 3 is a flowchart of a map display process.

Next, a map display process which is performed by the function of the navigation program 21 will be described. The map display process of the present embodiment is a process performed when a map is newly displayed or when there is a change in the location or scale of a map which is already displayed. First, by the function of the temporary arrangement module 21*a*, the control part 20 obtains a road line R (step S100). Namely, as shown in FIG. 2A, the control part 20 obtains a road line R which is a polyline that connects road points obtained by plotting nodes or shape interpolation points on a map.

Then, by the function of the temporary arrangement module 21*a*, the control part 20 obtains a reference line K (step S110). Namely, as shown in FIG. 2A, a reference line K which is a line offset from the road line R by a predetermined offset distance Y is obtained. The reference line K is a line along a road.

Then, by the function of the temporary arrangement module 21*a*, the control part 20 temporarily arranges characters on the reference line K (step S120). Namely, as shown in FIG. 2C, the control part 20 temporarily arranges text images T such that spacings D between center points C on the reference line K have a predetermined size. In the present embodiment, the spacings D have a size at which, when the text images T are arranged along a single straight line as shown in FIG. 2B, the text images T can be arranged with no clearance therebetween. In addition, the control part 20 temporarily arranges the text images T in directions such that the directions of bases (the directions V of the characters) coincide with the directions of portions of the reference line K at the center points C.

Then, by the function of the arrangement module 21*b*, the control part 20 selects center consecutive characters (step S130). Namely, when the number of characters is an even number (2M), the control part 20 first selects a spacing between consecutive characters including an Mth character and an (M+1)th character in an arrangement sequence in the direction of the road. In addition, when the number of characters is an odd number (2M+1), the control part 20 first selects consecutive characters including an Mth character and an (M+1)th character in an arrangement sequence in the direction of the road.

Then, by the function of the arrangement module 21*b*, the control part 20 determines whether the difference between the directions V of the selected center consecutive characters is greater than or equal to the threshold value (step S140). Namely, the control part 20 obtains the difference between the directions V of the selected center consecutive characters (the absolute value of an angle formed), and determines whether the difference is greater than or equal to the predetermined threshold value.

If it is determined that the difference between the directions V of the selected center consecutive characters is greater than or equal to the threshold value (step S140: Y), by the function of the arrangement module 21*b*, the control part 20 arranges all characters along a single arrangement straight line L. Specifically, the control part 20 arranges an arrangement straight line L that passes through a center point C of a text image T of either one of the selected center consecutive characters and that has the same direction as a direction V of the character. Then, the control part 20 corrects the center points C of the text images T of all characters onto the arrangement straight line L, and rotates each text image T around its center point C, and thereby corrects the directions V of the characters to be the same direction as the arrangement straight line L. At this time, the control part 20 maintains the spacing D between the consecutive characters at the spacing D for the temporary arrangement.

When all characters are arranged along the single arrangement straight line L, by the function of the arrangement module 21*b*, the control part 20 displays a map (step S400). Namely, the control part 20 displays a map showing a road and a route name of the road on the touch panel display.

On the other hand, if it is not determined that the difference between the directions V of the selected center consecutive characters is greater than or equal to the threshold value (step S140: N), by the function of the arrangement module 21*b*, the control part 20 selects consecutive characters in turn that are shifted one by one to the front side from the center consecutive characters (step S230). The front side is the side of the direction of the first character of the road name. In the examples of FIGS. 2B to 2D, the front side corresponds to the left side.

Then, by the function of the arrangement module 21*b*, the control part 20 determines whether the difference between the directions V of the selected consecutive characters is greater than or equal to the threshold value (step S240). Namely, the control part 20 obtains the difference between the directions V of the selected consecutive characters (present on the more front side than the center) (the absolute value of an angle formed), and determines whether the difference is greater than or equal to the predetermined threshold value.

If it is determined that the difference between the directions V of the selected consecutive characters is greater than or equal to the threshold value (step S240: Y), by the function of the arrangement module 21*b*, the control part 20 arranges the selected consecutive characters and a character(s) present on the more front side than the consecutive characters along a single arrangement straight line L (step S250). Specifically, the control part 20 arranges an arrangement straight line L that passes through a center point C of a text image T of one of the selected consecutive characters present on the center side and that has the same direction as a direction V of the character. Then, the control part 20 corrects the center points C of the text images T of the selected consecutive characters and all characters present on the more front side than the consecutive characters onto the arrangement straight lines L, and rotates each text image T around its center point C, and thereby corrects the directions V of the characters to be the same direction as the arrangement straight line L. At this time, the control part 20 maintains the spacing D between the consecutive characters at the spacing D for the temporary arrangement (see "1", "2", and "3" of FIG. 2D).

If it is not determined that the difference between the directions V of the selected consecutive characters is greater than or equal to the threshold value (step S240: Y), by the function of the arrangement module 21*b*, the control part 20 determines whether consecutive characters have been selected up to the front (step S260). Namely, the control part 20 determines whether all characters present on the more front side than the center character have been selected as consecutive characters.

If it is not determined that consecutive characters have been selected up to the front (step S260: N), by the function of the arrangement module 21*b*, the control part 20 returns to step S230. Namely, while consecutive characters are shifted one by one to the front side, a determination as to whether the difference between the directions V of the shifted consecutive characters is greater than or equal to the threshold value is repeatedly performed. Note that if it is not determined that the difference between the directions V of the selected consecutive characters is greater than or equal to the threshold value (step S240: N), without correcting the arrangement of the consecutive characters (the temporary arrangement state is maintained), next consecutive characters are selected as a processing target.

If it is determined that consecutive characters have been selected up to the front (step S260: Y) or if the selected consecutive characters and a character(s) present on the more front side than the consecutive characters are arranged along the single arrangement straight line L (step S250), by the function of the arrangement module 21*b*, the control part 20 selects consecutive characters in turn that are shifted one by one to the end side from the center consecutive characters selected in step S130 (step S330). The end side is the side of the direction of the last character of the road name. In the examples of FIGS. 2B to 2D, the end side corresponds to the right side.

Then, by the function of the arrangement module 21*b*, the control part 20 determines whether the difference between the directions V of the selected consecutive characters is greater than or equal to the threshold value (step S340). Namely, the control part 20 obtains the difference between the directions V of the selected consecutive characters (present on the more end side than the center) (the absolute value of an angle formed), and determines whether the difference is greater than or equal to the predetermined threshold value.

If it is determined that the difference between the directions V of the selected consecutive characters is greater than or equal to the threshold value (step S340: Y), by the function of the arrangement module 21*b*, the control part 20 arranges the selected consecutive characters and a character(s) present on the more end side than the consecutive characters along a single arrangement straight line L (step S350). Specifically, the control part 20 arranges an arrangement straight line L that passes through a center point C of a text image T of one of the selected consecutive characters present on the center side and that has the same direction as a direction V of the character. Then, the control part 20 corrects the center points C of the text images T of the selected consecutive characters and all characters present on the more end side than the consecutive characters onto the arrangement straight line L, and rotates each text image T around its center point C, and thereby corrects the directions V of the characters to be the same direction as the arrangement straight line L. At this time, the control part 20 maintains the spacing D between the consecutive characters at the spacing D for the temporary arrangement (see "6" and "7" of FIG. 2D).

When the selected consecutive characters and a character(s) present on the more end side than the consecutive characters are arranged along the single arrangement straight line L, by the function of the arrangement module 21*b*, the control part 20 displays a map (step S400). Namely, the control part 20 displays a map showing a road and a route name of the road on the touch panel display.

On the other hand, if it is not determined that the difference between the directions V of the selected consecutive characters is greater than or equal to the threshold value (step S340: Y), by the function of the arrangement module 21*b*, the control part 20 determines whether consecutive characters have been selected up to the end (step S360). Namely, the control part 20 determines whether all characters present on the more end side than the center character have been selected as consecutive characters.

If it is not determined that consecutive characters have been selected up to the end (step S360: N), by the function of the arrangement module 21*b*, the control part 20 returns to step S330. Namely, while consecutive characters are shifted one by one to the end side, a determination as to whether the difference between the directions V of the shifted consecutive characters is greater than or equal to the threshold value is repeatedly performed. Note that if it is not determined that the difference between the directions V of the selected consecutive characters is greater than or equal to the threshold value (step S340: N), without correcting the arrangement of the consecutive characters (the temporary arrangement state is maintained), next consecutive characters are selected as a processing target.

If it is determined that consecutive characters have been selected up to the end (step S360: Y), by the function of the arrangement module 21*b*, the control part 20 displays a map (step S400). Namely, the control part 20 displays a map showing a road and a route name of the road on the touch panel display. When processes are repeated until Yes at both step S260 and S360, all characters are maintained in the temporary arrangement state, and a map is displayed with all characters arranged along the road.

(3) Other Embodiments

Although, in the above-described embodiment, the directions V of characters are obtained on the reference line K which is offset from the road line R by the offset distance Y, the directions V of characters may be obtained on the road line R. Furthermore, characters may be temporarily arranged/arranged on the road line R. The control part 20 may arrange characters on the road line R and thereafter move the characters by the offset distance Y. Needless to say, the offset distance Y may be 0. In a case of arranging characters on the road line R, too, when the difference between the directions V of consecutive characters is greater than or equal to the threshold value, the control part 20 arranges the consecutive characters so as to reduce the difference.

Figure 4:
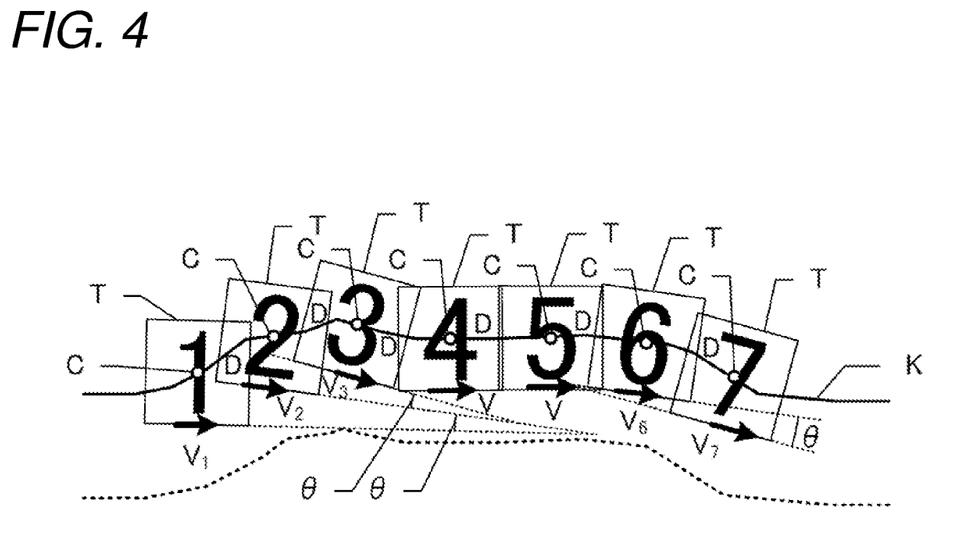
FIG. 4 is an example of a map.

Furthermore, when the difference between the directions V of consecutive characters is greater than or equal to the threshold value, the control part 20 arranges the consecutive characters so as to reduce the difference, and does not necessarily need to arrange the consecutive characters such that the difference is 0. FIG. 4 shows an example in which characters are arranged such that the difference between the directions V of consecutive characters is a threshold value θ. The control part 20 arranges characters from the center of a character string to the outer side in turn. When the difference between the directions V of consecutive characters is greater than or equal to the threshold value θ, the control part 20 corrects the direction V of one of the consecutive characters on the outer side (on the front or end side of the character string), and thereby makes the difference between the directions V of the consecutive characters equal to the threshold value θ. When the above process is completed, the control part 20 arranges a next character on the outer side, and repeatedly performs the same process until the ends of the character string.

The example of FIG. 4 shows a state in which the difference between the directions $V_6$ and $V_7$ of consecutive characters including "6" and "7" is greater than or equal to the threshold value θ, and by correcting "7" which is one of the consecutive characters on the outer side, the difference between the directions $V_6$ and $V_7$ of the consecutive characters becomes the threshold value θ. Likewise, the example of FIG. 4 shows a state in which the difference between the directions $V_3$ and $V_2$ of consecutive characters including "3" and "2" is greater than or equal to the threshold value θ, and by correcting "2" which is one of the consecutive characters on the outer side, the difference between the directions $V_3$ and $V_2$ of the consecutive characters becomes the threshold value θ. Furthermore, the example of FIG. 4 shows a state in which the difference between the directions $V_2$ and $V_1$ of consecutive characters including "2 (corrected)" and "1" is greater than or equal to the threshold value θ, and by correcting "1" which is one of the consecutive characters on the outer side, the difference between the directions $V_2$ and $V_1$ of the consecutive characters becomes the threshold value θ.

The control part 20 does not necessarily need to perform, by the function of the temporary arrangement module 21*a*, the process of actually temporarily arranging characters, as long as the control part 20 is configured to obtain the directions of a plurality of characters for when the plurality of characters are temporarily arranged along a road in a direction of the road which is a reference direction. Although, in the embodiment, consecutive characters which are the first target for correction of a spacing are consecutive characters temporarily arranged at the center in the direction of the road, consecutive characters to be selected may be consecutive characters temporarily arranged at an end on the front or end side in the direction of the road. In this case, the direction in which consecutive characters are shifted is a single direction. In addition, although the embodiment exemplifies a road in a left-right direction of a map, the direction of a road may be any direction. Namely, the direction in which consecutive characters are shifted does not need to be the left-right direction. The front and end sides of a plurality of characters can vary depending on the direction of a road, and may be set according to the user setting or language.

Furthermore, the control part 20 does not necessarily need to individually determine, for each set of consecutive characters, whether the difference between directions V is greater than or equal to the threshold value. For example, the control part 20 may obtain, for each set of consecutive characters, the difference between directions V, and when the maximum value of the differences is greater than or equal to a threshold value, the control part 20 may arrange all characters along a single arrangement straight line L, and when the maximum value of the differences is less than the threshold value, the control part 20 may maintain the arrangement of all characters in a temporary arrangement state. Namely, the control part 20 does not necessarily need to determine, for each part of a plurality of characters, whether to arrange along a single arrangement straight line L. In addition, the control part 20 may obtain, for each set of consecutive characters, the difference between directions V, and when the minimum value, total value, average value, etc., of the differences is greater than or equal to a threshold value, the control part 20 may arrange all characters along a single arrangement straight line L.

As used herein, the expression "characters are temporarily arranged in a direction of a road which is a reference direction" refers to that characters are arranged at a predetermined angle with respect to the direction of the road. For example, the temporarily arranging part may arrange characters in a direction such that an arrangement direction of the characters is parallel to the direction of the road. For example, when a region assigned to one character is rectangular, the temporarily arranging part may arrange the character in a direction such that the top and bottom sides or left and right sides of the region are parallel to the direction of the road. By this, a plurality of characters can be temporarily arranged transversely or longitudinally in a direction parallel to the direction of the road.

The direction of a road is a direction in which mobile means such as a vehicle moves on the road, and may be, for example, a direction of a polyline or curve that links or approximates shape interpolation points or nodes which are arranged at the center in a width direction of the road. In addition, a position in which a plurality of characters are temporarily arranged may be a position on the road, or may be a position offset from the road by a certain distance. For example, the position in which a plurality of characters are temporarily arranged may be a position in which the road and the characters do not overlap each other. The plurality of characters may represent any information about the road and may represent, for example, a road name, a destination, control information, etc. In addition, as long as the directions of respective characters can be obtained by temporarily arranging the characters, the characters do not necessarily need to be actually arranged.

Consecutive characters are two characters that are consecutively and temporarily arranged in the direction of the road and that have no other characters therebetween in the direction of the road. The difference between the directions of consecutive characters refers to an angle formed by the direction of the first one of the consecutive characters and the direction of the second one of the consecutive characters. The arranging part arranges consecutive characters whose difference in direction is greater than or equal to the threshold value along a single arrangement straight line such that the directions of the consecutive characters are identical to each other, and various techniques for setting an arrangement straight line are considered. For example, the arranging part may set an arrangement straight line so as to maintain the position and direction of one of consecutive characters, or may set an arrangement straight line such that both consecutive characters are arranged in the average position and direction of the original positions and directions. In addition, when an arrangement straight line is set, the arranging part may also arrange characters other than consecutive characters along the arrangement straight line. On the other hand, when the difference between the directions of consecutive characters is less than the threshold value, the arranging part maintains the arrangement of the consecutive characters in a temporary arrangement state.

In addition, some of a plurality of characters may be arranged in a temporary arrangement position, and the rest of the plurality of characters may be arranged along an arrangement straight line. A portion with poor appearance and readability can be arranged along an arrangement straight line, and other portions can maintain a state of being arranged along the road. Therefore, both the impression that the characters are arranged along the road, and appearance and readability can be obtained.

Furthermore, some of a plurality of characters including the center may be arranged in a temporary arrangement position, and the rest of the plurality of characters may be arranged along an arrangement straight line. Since a portion including the center can maintain a state of being arranged along the road, the impression that the characters are arranged along the road can be attained.

Furthermore, a technique for arranging consecutive characters along a single arrangement straight line according to the difference between the directions of the consecutive characters as in the present embodiments is also applicable as a program or a method. In addition, a system, a program, and a method such as those described above may be implemented as a single apparatus, or may be implemented by using parts shared with parts included in a vehicle, or may include various modes. For example, it is possible to provide a navigation system including an apparatus such as that described above, and a map display system, method, and program. In addition, changes can be made as appropriate, e.g., a part is software and a part is hardware. Furthermore, the features described above may be embodied as a recording medium for a program that controls an apparatus. Needless to say, the recording medium for software may be a magnetic recording medium or a magneto-optical recording medium, or even any recording medium to be developed in the future can also be considered exactly in the same manner.

REFERENCE SIGNS LIST

10: Navigation system, 20: Control part, 21: Navigation program, 21$a$: Temporary arrangement module, 21$b$: Correction module, 30: Recording medium, 30$a$: Map information, 41: GPS receiving part, 42: Vehicle speed sensor, 43: Gyro sensor, 44: User I/F part, C: Center point, K: Reference line, L: Arrangement straight line, R: Road line, T: Text image, V: Direction, and Y: Offset distance

The invention claimed is:

1. A map display system comprising:
at least one processor configured to implement:
a temporary arranging part that obtains directions of a plurality of characters for when the plurality of characters are temporarily arranged along a road in a direction of the road, the direction of the road being a reference direction; and
an arranging part that
arranges, when a difference between directions of consecutive characters is greater than or equal to a threshold value, the consecutive characters so as to reduce the difference, the consecutive characters being two consecutive characters in the direction of the road, and
arranges, when the difference is less than the threshold value, the consecutive characters in a temporary arrangement position.

2. The map display system according to claim 1, wherein when the difference between the directions of the consecutive characters is greater than or equal to the threshold value, the arranging part arranges the consecutive characters along a single arrangement straight line such that the directions are identical.

3. The map display system according to claim 2, wherein some of the plurality of characters are arranged in the temporary arrangement position, and a rest of the plurality of characters is arranged along the arrangement straight line.

4. The map display system according to claim 3, wherein some of the plurality of characters including a center are arranged in the temporary arrangement position, and a rest of the plurality of characters is arranged along the arrangement straight line.

5. A non-transitory computer-readable storage medium storing a program causing a computer to function as:
a temporary arranging part that obtains directions of a plurality of characters for when the plurality of characters are temporarily arranged along a road in a direction of the road, the direction of the road being a reference direction; and an arranging part that arranges, when a difference between directions of consecutive characters is greater than or equal to a threshold value, the consecutive characters so as to reduce the difference, the consecutive characters being two consecutive characters in the direction of the road, and arranges, when the difference is less than the threshold value, the consecutive characters in a temporary arrangement position.

\* \* \* \* \*